(12) United States Patent
Yamagami et al.

(10) Patent No.: US 7,417,585 B2
(45) Date of Patent: Aug. 26, 2008

(54) RADAR SCANNING METHOD

(75) Inventors: Takashi Yamagami, Hyogo (JP);
Masaki Hitotsuya, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 57 days.

(21) Appl. No.: 10/971,165

(22) Filed: Oct. 25, 2004

(65) Prior Publication Data

US 2005/0140541 A1    Jun. 30, 2005

(30) Foreign Application Priority Data

Oct. 24, 2003  (JP)  ............................. P2003-364818

(51) Int. Cl.
*G01S 13/04* (2006.01)
*G01S 7/00* (2006.01)

(52) U.S. Cl. ............................. 342/158; 342/27; 342/70; 342/118; 342/146; 342/147; 342/175; 342/195

(58) Field of Classification Search ......... 180/167–169; 701/300, 301; 342/27, 28, 70–72, 118, 127–133, 342/146, 147, 158, 175, 195, 104, 107, 108–114, 342/73–81
See application file for complete search history.

(56) References Cited

U.S. PATENT DOCUMENTS

| | | | | |
|---|---|---|---|---|
| 4,573,050 A | * | 2/1986 | Waters | ........................ 342/158 |
| 5,506,585 A | * | 4/1996 | Shiratori | ...................... 342/71 |
| 5,745,070 A | * | 4/1998 | Yamada | ........................ 342/70 |
| 5,767,803 A | * | 6/1998 | Yamada | ........................ 342/70 |
| 6,067,038 A |   | 5/2000 | Uchara et al. | |
| 6,795,014 B2 | * | 9/2004 | Cheong | ........................ 342/118 |
| 6,856,277 B2 | * | 2/2005 | Katayama et al. | ............. 342/70 |
| 2002/0157887 A1 | | 10/2002 | Sugawara et al. | |

FOREIGN PATENT DOCUMENTS

| | | |
|---|---|---|
| JP | A 11-038133 | 2/1999 |
| JP | 11-072561 | 3/1999 |
| JP | A 11-072561 | 3/1999 |
| JP | A 11-160436 | 6/1999 |
| JP | A 11-281735 | 10/1999 |
| JP | A 2000-009831 | 1/2000 |
| JP | A 2000-046947 | 2/2000 |
| JP | 2000-075030 | 3/2000 |
| JP | 2001 027670 A | 1/2001 |
| JP | A 2001-126194 | 5/2001 |
| JP | A 2001-126196 | 5/2001 |
| JP | A 2002-162469 | 6/2002 |
| JP | A 2003-090877 | 3/2003 |
| WO | WO 01/67131 A1 | 9/2001 |

* cited by examiner

*Primary Examiner*—Bernarr E Gregory
(74) *Attorney, Agent, or Firm*—Oliff & Berridge, PLC

(57) ABSTRACT

A scanning method of an in-vehicle scanning-type radar for emitting beams subsequently to execute scanning and for detecting an object includes determining whether or not the object is in an approaching state. When it is determined that the object is not in the approaching state, executed is a first scanning for scanning within a first angle range. When it is determined that the object is in the approaching state, executed is a second scanning for scanning within a second angle range that is narrower than the first angle. A period during which the radar scans the second angle range once in the second scanning is shorter than that during which the radar scans the first angle range once in the first scanning.

27 Claims, 17 Drawing Sheets

Es: NORMAL SCANNING AREA

EG: APPROACHING AREA

Er: LIMITED SCANNING AREA

Er: LIMITED SCANNING AREA

E_R1: LIMITED SCANNING AREA AT TIME T
E_R2: LIMITED SCANNING AREA AT TIME T+1

RADAR SCANNING METHOD

BACKGROUND OF THE INVENTION

1. Field of the Invention

The present invention relates to a method for radar scanning, which switch between normal processing and emergency processing performed when it is determined that an object is in an approaching state.

2. Description of the Related Art

Radar for scanning a forward area to recognize an object has been applied to a tracking control device or collision preventing device.

A method for detecting an obstacle for a vehicle has been proposed in a device provided with such a radar. In this method, it is determined whether or not an obstacle is dangerous and when there is a risk of collision, warning is issued (JP-A-2001-126196).

A technique has been also proposed for setting a searching area and a scanning pattern according to a searching result in order for an object detection device to obtain appropriate information at all times (JP-A-2002-162469).

A technique has been also proposed for increasing a scanning speed to decrease a data updating period in a warning mode and for decreasing the scanning speed to increase the data updating period in a following mode (JP-A-Hei.11-38133).

Further, a radar device has been proposed for detecting the distance to a target by the beam scanning at a first step and for detecting the relative speed of the target by the beam scanning at a second step (JP-A-2000-9831).

Further, in order to prevent a scanning motor and a driving circuit from being excessively heated in a preceding vehicle start detecting mode, a device has been also proposed for carrying out distance measurement through scanning by measuring means at least once and for fixing a distance measuring direction when the preceding vehicle start detecting mode is set on the basis of the measurement result (JP-A-2000-46947).

Furthermore, an obstacle detecting device has been also proposed, which searches a preceding vehicle by laser scanning if there is not the preceding vehicle and causes the laser to follow the preceding vehicle when the preceding vehicle is detected so that the preceding vehicle is not lost during running a curve road (JP-A-Hei.11-160436).

SUMMARY OF THE INVENTION

The radar generally performs scanning at a constant period and angle to recognize an object. Therefore, even in a state where the object such as a vehicle ahead approaches to a user's vehicle, the scanning is executed at the constant period and angle. On the other hand, if the moving speed of the object is high, the processing of recognizing the object must be adjusted to the movement of the object.

In order to solve the above problem, the invention provides a method and a radar that switches the scanning method from a normal processing to an emergency processing when the object becomes in the approaching state and executes processing corresponding to the approaching state. Thereby, the object can be recognized quickly.

According to one embodiment of the invention, a scanning method of an in-vehicle scanning-type radar for emitting beams subsequently to execute scanning and for detecting an object includes determining whether or not the object is in an approaching state. When it is determined that the object is not in the approaching state, executed is a first scanning for scanning within a first angle range. When it is determined that the object is in the approaching state, executed is a second scanning for scanning within a second angle range that is narrower than the first angle. A period during which the radar scans the second angle range once in the second scanning is shorter than that during which the radar scans the first angle range once in the first scanning.

The radar may execute the second scanning with a front of a vehicle being in a center of the scanning. Alternatively, the radar may execute the second scanning with the detected object being in a center of the scanning.

Further alternatively, the radar may execute the second scanning with the detected object being in a center of the scanning while the radar changes the center of the scanning in accordance with change of a position of the object.

According to one embodiment of the invention, a scanning method of an in-vehicle scanning-type radar for emitting beams within a predetermined angle range subsequently to execute scanning and detecting an object, includes determining whether or not the object is in an approaching state. When it is determined that the object is not in the approaching state, the radar scans within the predetermined angle range. When it is determined that the object is in the approaching state, the radar scans at a predetermined angle.

The predetermined angle may correspond to a front of a vehicle. Alternatively, the predetermined angle may correspond to an angle at which the object is detected.

When a distance between a vehicle and the object is not larger than a determined distance, it may be determined that the object is in the approaching state.

Alternatively, when the object approaches to a vehicle at a relative speed not lower than a predetermined speed, it may be determined that the object is in the approaching state.

Further alternatively, when a distance between a vehicle and the object is not larger than a predetermined distance and the object approaches to the vehicle at a relative speed not lower than a predetermined speed, it may be determined that the object is in the approaching state.

Still further alternatively, when (a) a distance between a vehicle and the object is not larger than a predetermined distance; (b) the object approaches to the vehicle at a relative speed not lower than a predetermined speed; and (c) an angle between the radar and the object is not larger than a predetermined angle, it may be determined that the object is in the approaching state.

When it is determined that the object is in the approaching state, warning may be issued.

Object information including at least one of a distance between a vehicle and the object, a relative speed therebetween, and an angle therebetween may be stored.

According to one embodiment of the invention, a radar emits beams subsequently to execute scanning and detects an object. The radar includes an antenna, a signal processing circuit, and a scanning mechanism. The antenna emits the beams and receives reflected beams. The signal processing circuit inputs transmission signals to the antenna to causes the antenna to emit the beams, receives reflected signals from the antenna in response to the reflected beams, determines whether or not the object is in an approaching state, and inputs control signals to the scanning mechanism. The scanning mechanism controls a direction of the antenna and an angle range of the scanning in accordance with the control signals input from the signal processing circuit. When the signal processing circuit determines that the object is not in the approaching state, the scanning mechanism controls the direction of the antenna to execute a first scanning for scanning within a first angle range. When the signal processing circuit determines that the object is in the approaching state, the scanning mechanism controls the direction of the antenna to execute a second scanning for scanning within a second angle range that is narrower than the first angle. A period during which the radar scans the second angle range once in the second scanning is shorter than that during which the radar scans the first angle range once in the first scanning.

With the above described method and the radar, when the object becomes in the approaching state, the scanning method is switched from the normal processing to the emergency processing to execute processing corresponding to the approaching state. Thereby, the object being in the approaching state can be recognized and monitored quickly and intensively. As a result, collision between the user's vehicle and the object can be avoided quickly and surely.

DETAILED DESCRIPTION OF THE PREFERRED EMBODIMENT

Figure 1:
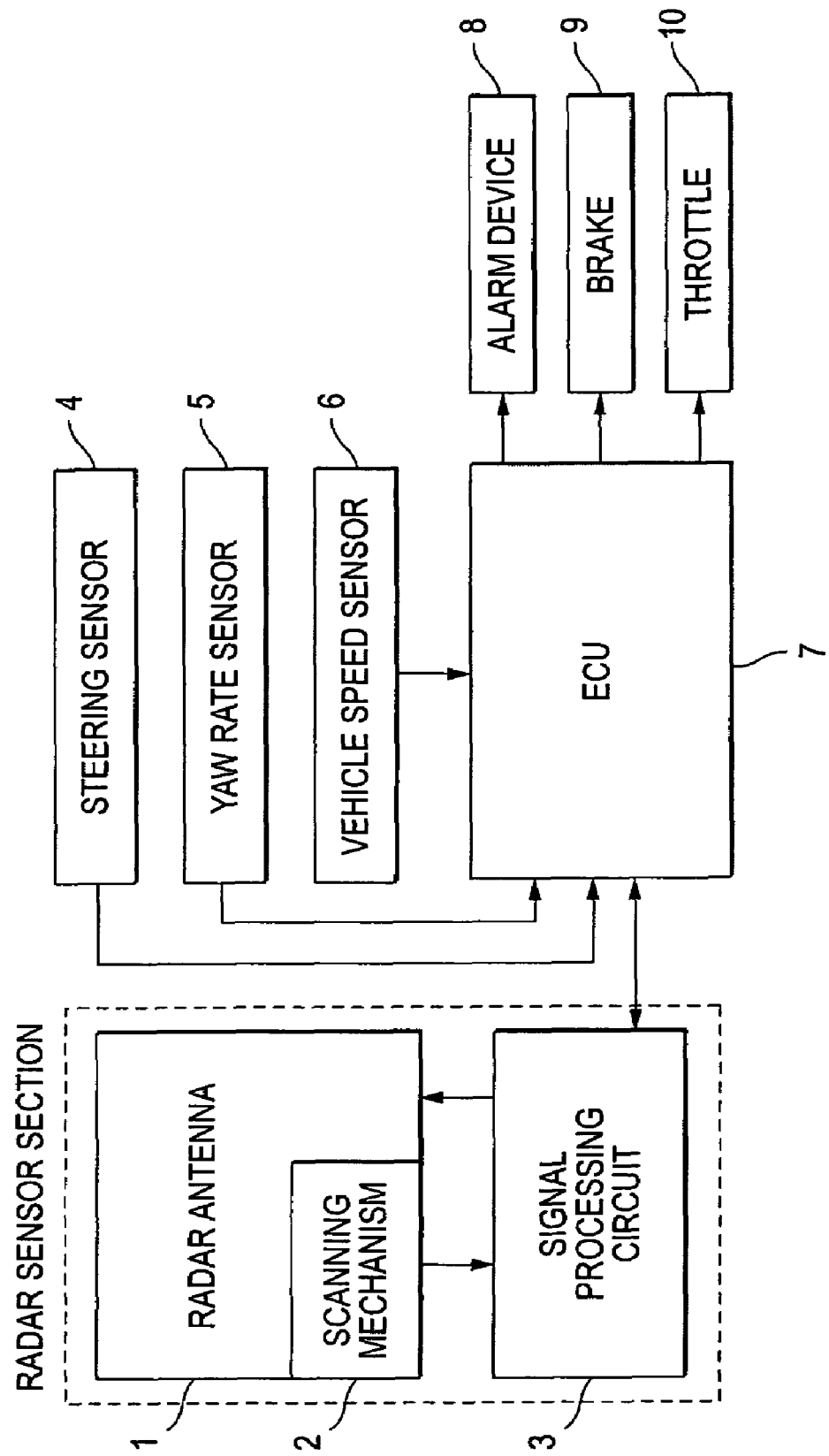
FIG. 1 is a block diagram showing a schematic configuration of a device for controlling a distance between vehicles using a scanning-type radar according to one embodiment of the invention.

FIG. 1 is a block diagram showing a schematic configuration of a device for controlling a distance between vehicles with a scanning-type radar to which a method according to an embodiment of the invention is applied. Although FIG. 1 illustrates the device for controlling a distance between vehicles as an example of a device to which the embodiment of the invention is applied, the method according to the embodiment of the invention can be applied to devices other than the device for controlling a distance between vehicles. Although a radar sensor section shown in FIG. 1 is directed to a mechanical scanning system, the embodiment of the invention can be applied to an electronic scanning system such as a phased array antenna system.

In FIG. 1, the radar sensor section includes a radar antenna 1, a scanning mechanism 2, and a signal processing circuit 3. An ECU 7 for controlling a distance between vehicles receives signals from a steering sensor 4, a yaw rate sensor 5, a vehicle speed sensor 6, and the signal processing circuit 3 of the radar sensor section to control an alarm device 8, a brake 9, and a throttle 10. The ECU 7 also transmits a signal to the signal processing circuit 3 of the radar sensor section.

Figure 2:
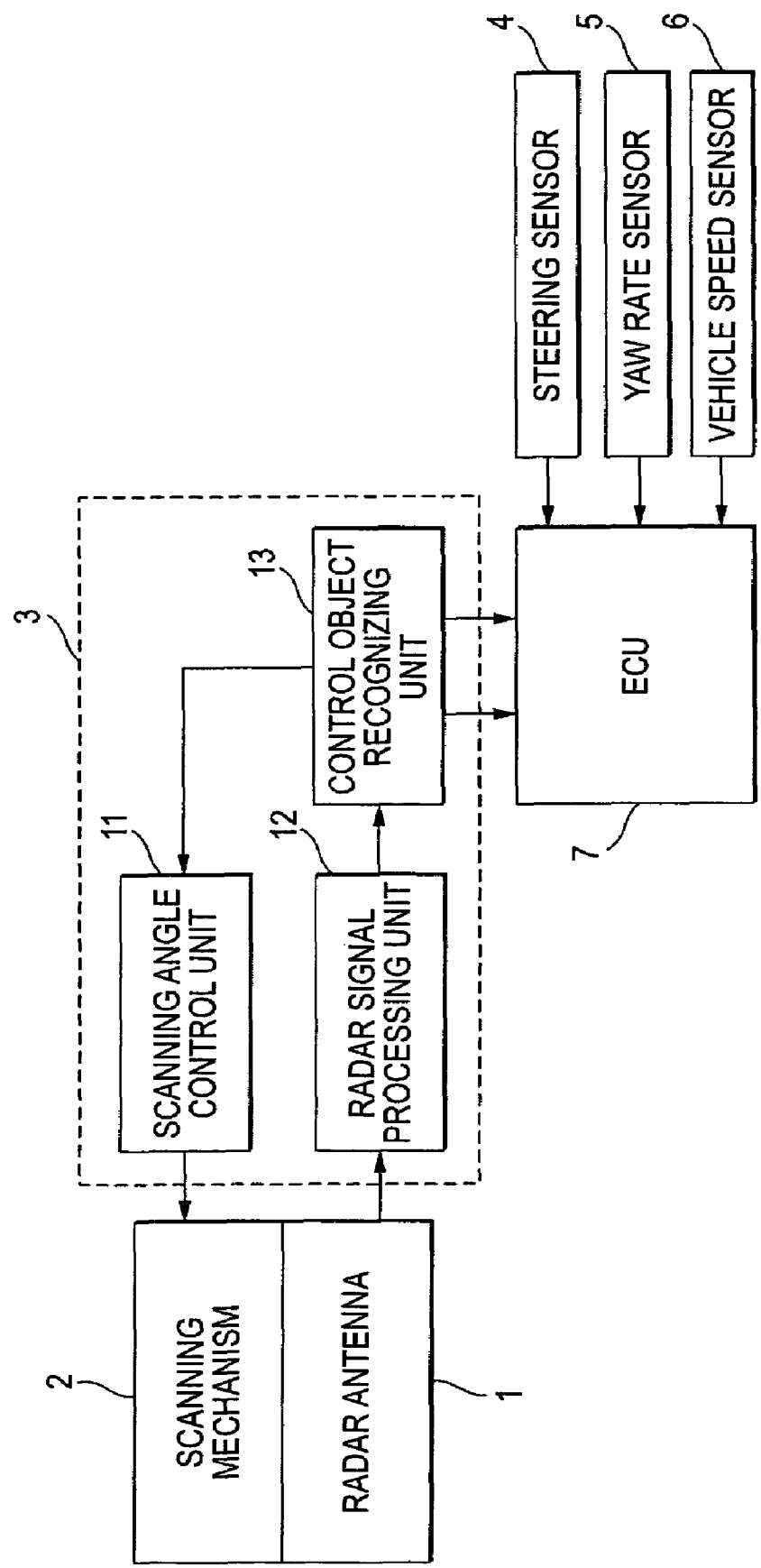
FIG. 2 is a block diagram showing the configuration of a signal processing circuit 3 of FIG. 1.

FIG. 2 is a block diagram showing a configuration of the signal processing circuit 3 shown in FIG. 1. The signal processing circuit 3 includes a scanning angle control unit 11, a radar-signal processing unit 12 and a control object recognizing unit 13. The radar-signal processing unit 12 performs FFT-processing with respect to a reflecting signal from the radar antenna 1; detects a power spectrum; computes the distance to an object, relative speed of the object, and angle of the object; and sends the data computed to the control object recognizing unit 13. The control object recognizing unit 13 gives a scanning angle to the scanning angle control unit 11 on the basis of: the distance to the object, the relative speed thereof and angle thereof received from the radar-signal processing unit 12; and vehicle information received from the ECU 7, which has been obtained from the steering sensor 4, the yaw rate sensor 5 and the vehicle speed sensor 6. The control object recognizing unit 13 also determines an object of control to transmit the determined object of control to the ECU 7. The scanning angle control unit 11 controls normal scanning and limited scanning describe later. The scanning angle control unit 11 stops the antenna at a predetermined angle. Also, the scanning angle control unit 11 controls the central position of the antenna and range of the scanning angle of the antenna in the limited scanning. The scanning mechanism 2 receives a control signal from the scanning control unit 11 to emit beams successively at a predetermined angle for scanning.

Figure 3:
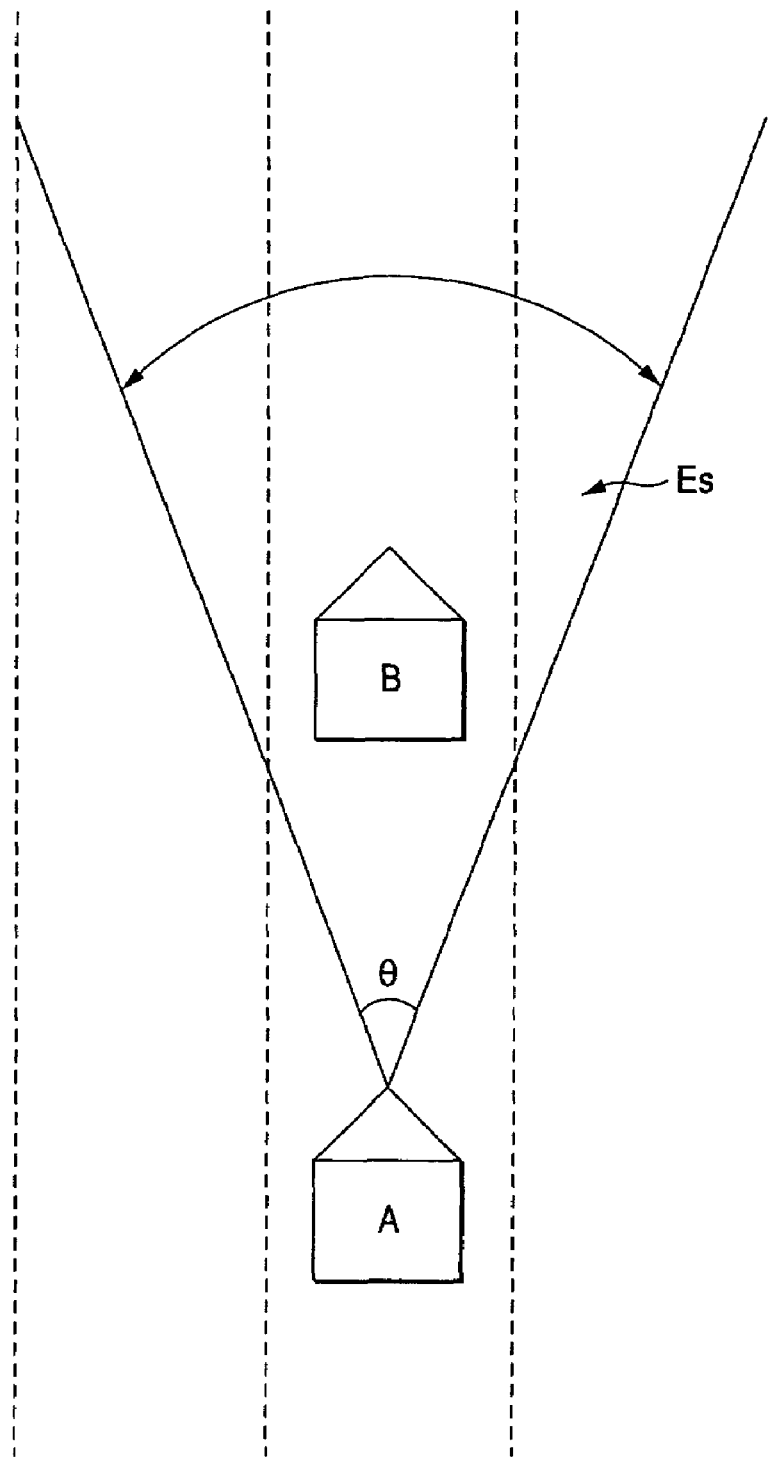
FIG. 3 is a view showing a state of a normal scanning that is executed when an object is not in an approaching state.

FIG. 3 is a view showing a state of the "normal scanning" that is carried out when an object is not in an approaching state. In FIG. 3, reference symbol A denotes a user's vehicle, and reference symbol B denotes a vehicle ahead, which is the target object. Further, in FIG. 3, Es denotes a normal scanning area. For example, in a range of θ=16°, 16 (sixteen) beams are emitted ahead when the scanning is once performed.

Figure 4:
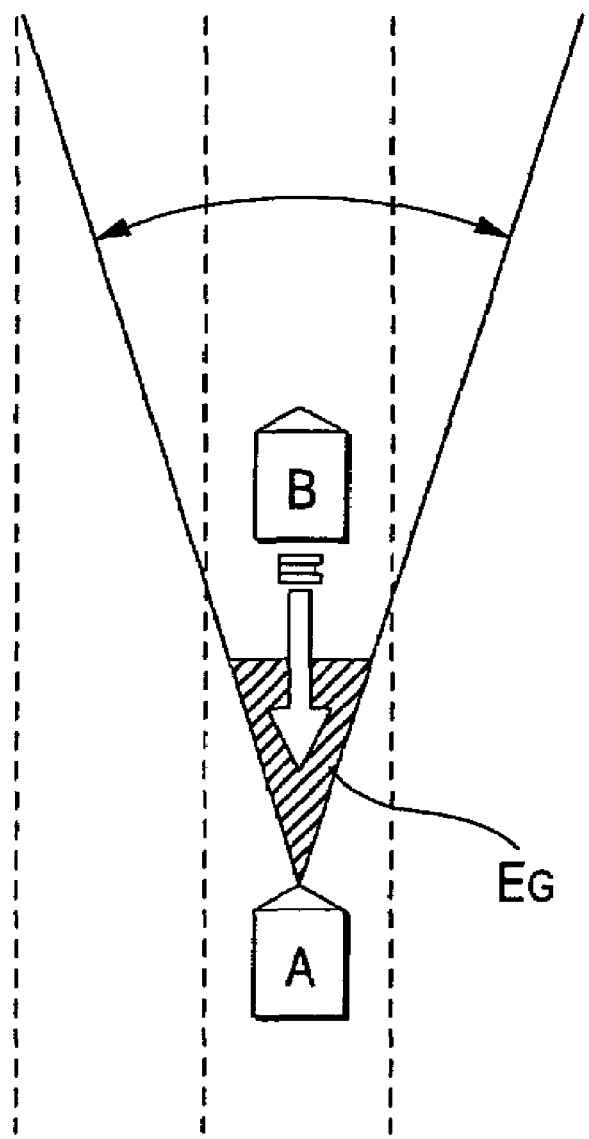
FIG. 4 is a view for explaining a approaching area in embodiments of the invention.

FIG. 4 is a view for explaining a approaching area in the embodiment of the invention. Where the vehicle ahead B comes close to the user's vehicle A to be within a predetermined distance from the user's vehicle A and enters a shaded approaching area $E_G$, it is determined that the object is in the approaching state. Also, when the vehicle ahead B is approaching at a relative speed not lower than a predetermined speed, it is determined that the object is in the approaching state. In addition, also when the vehicle ahead B functioning as the object is within a predetermined angle range when viewed from the user's vehicle A, it is determined that the object is in the approaching state.

Figure 5:
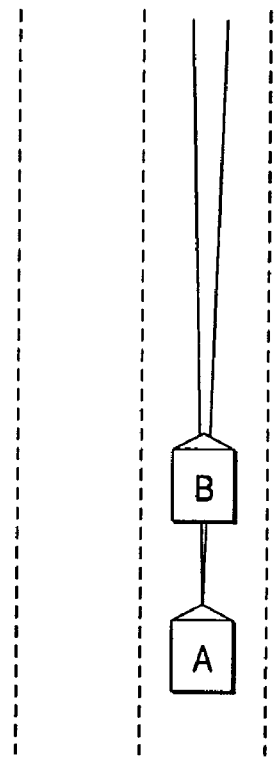
FIG. 5 is a view showing a state where an antenna is stopped so as to be oriented to the front as emergency processing when it is determined that an object is in the approaching state.
Figure 6:
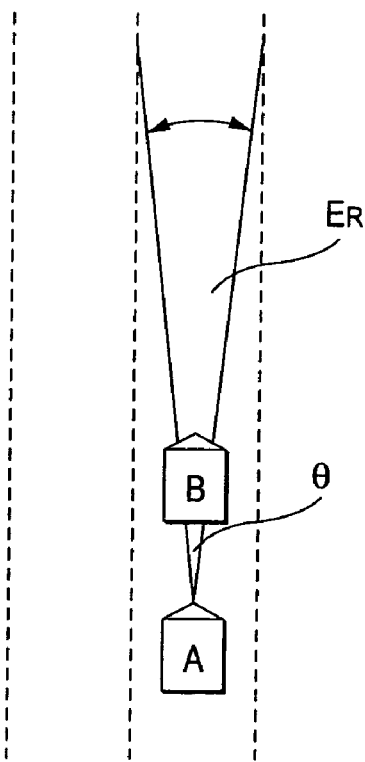
FIG. 6 is a view showing a state where when it is determined that an object is in the approaching state, an antenna is oriented to the front as the emergency processing and then the antenna executes a limited scanning around such an angle.

FIGS. 5 and 6 are views showing how to operate the antenna as emergency processing when it is determined that the object is in the approaching state.

FIG. 5 shows a state where the antenna is oriented to the front of the user's vehicle (hereinafter simply referred to as "the front") and is stopped as the emergency processing when it is determined that the object is in the approaching state. In this way, since the antenna is stopped while being oriented to the front, the object that is present in front of the user's vehicle and is at risk of collision can be intensively detected.

FIG. 6 shows a state where when it is determined that an object is in the approaching state, the antenna scans in a limited scanning area $E_R$ around the angle at which the antenna is oriented to face the front as the emergency processing. The limited scanning area $E_R$ has a narrower angular range than that in the normal scanning. Hereinafter, this scanning is referred to as "limited scanning". In the case of the normal scanning described above, 16 beams are emitted forward within the range of θ=16° while the scanning is once performed. On the other hand, in the case of the limited scanning, 3 (three) beams are emitted forward within the range of θ=3° while the scanning is once performed. Further, the scanning angle is decreased to shorten time taken for scanning once performed, thereby increasing the detection cycle of the object.

In this way, the limited scanning is performed around the angle at which the antenna is oriented to face the front. Thereby, an object that is present in front of the user's vehicle and is at risk of collision can be intensively detected.

Incidentally, it is needless to say that the above scanning angle and number of emitted beams in the normal scanning and the limited scanning are exemplary and may be set desirably.

Figure 7:
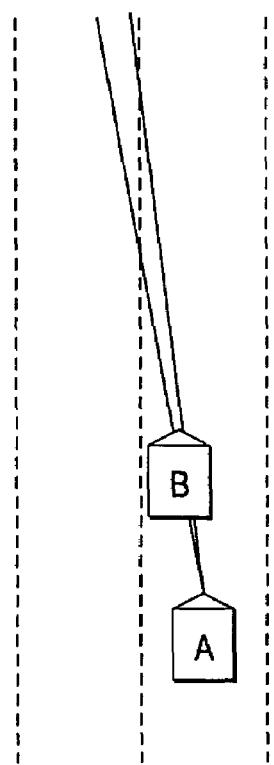
FIG. 7 is a view showing a state where an antenna is stopped so as to be oriented to a vehicle ahead, which is a target object, as the emergency processing when it is determined that the object is in the approaching state.
Figure 8:
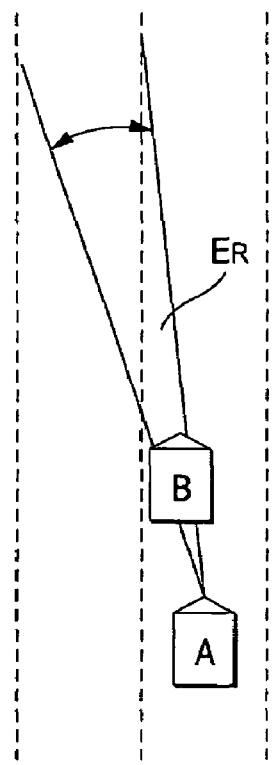
FIG. 8 is a view showing a state where when it is determined that an object is in the approaching state, an antenna is oriented to a vehicle ahead, which is a target object, as the emergency processing and then the antenna executes the limited scanning around such an angle.

FIGS. 7 and 8 are views showing another example on how to operate the antenna as emergency processing when it is determined that an object is in the approaching state.

FIG. 7 shows a state where the antenna is oriented to the vehicle ahead B, which is a target object, and is stopped as the emergency processing when it is determined that the object is in the approaching state. In this way, since the antenna is stopped while being oriented to the object, the object that is present in the approaching state can be intensively detected.

FIG. 8 shows a state where when it is determined that an object is in the approaching state, the antenna scans in a limited scanning area $E_R$ around the angle at which the antenna is oriented to face the vehicle ahead B as the emergency processing. The limited scanning area $E_R$ has a narrower angular range than that in the normal scanning. In this way, the limited scanning is performed around the angle at which the antenna is oriented to face the object. Thereby, an object that is in the approaching state can be intensively detected.

Figure 9:
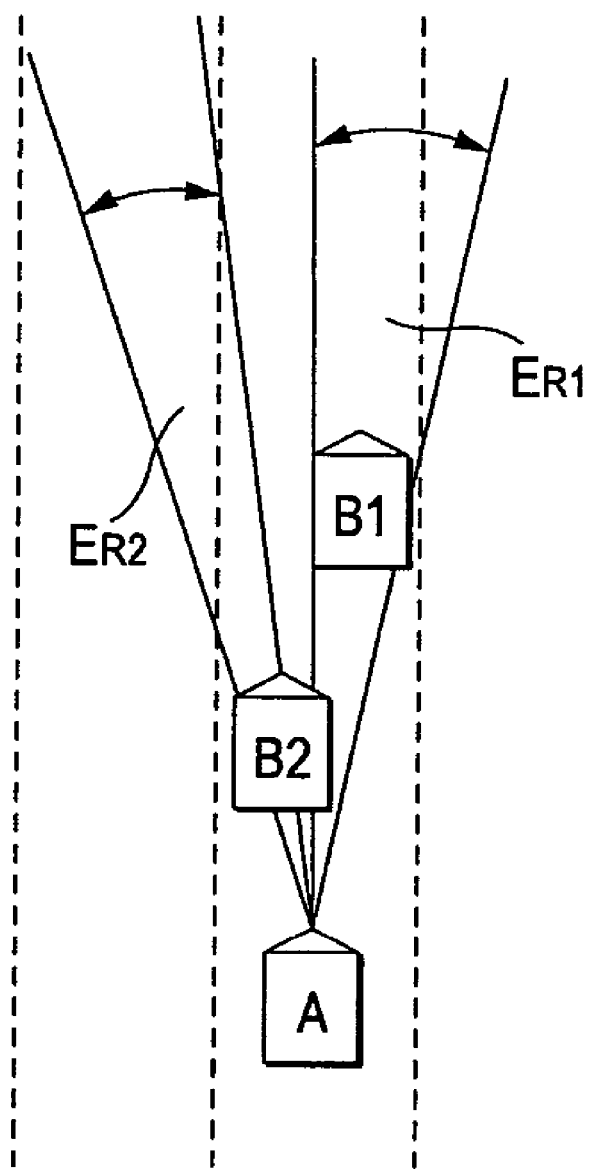
FIG. 9 is a view showing a state where when it is determined that an object is in the approaching state, an antenna is oriented to a vehicle ahead, which is a target object, as the emergency processing; the antenna executes the limited scanning around such an angle; and whenever a position of the vehicle ahead changes so that the angle of the vehicle ahead is changed, the antenna executes the limited scanning around the resultant angle.

FIG. 9 shows a state where when it is determined that an object is in the approaching state, the antenna is oriented to the vehicle ahead B, which is a target object, as the emergency processing; the antenna performs the "limited scanning" for scanning in a limited scanning area $E_R$ around such an angle; and the central angle of the limited scanning is changed every time a position of the vehicle ahead B is changed and thereby the angle of the antenna is changed.

As shown in FIG. 9, when the vehicle ahead is located at a position B1, the "limited scanning" is performed in a narrower angle range $E_{R1}$ than that in the normal scanning. When the vehicle ahead moves from the position B1 to a position B2, the limited scanning is performed in a narrower angle range $E_{R2}$ than that in the normal scanning.

In this way, even when the angle of the antenna changes as a result that an object moves, an object being in the approaching state can be intensively detected by changing the angle of the antenna as the object moves and performing the limited scanning around the angle at which the antenna is oriented to face the object.

Incidentally, in the above explanation, although a vehicle ahead is used as an example of a target object, an object should not be limited to a vehicle ahead. All objects (things fallen on a road, things fixed on a road shoulder, etc.), with which a user's vehicle must avoid to collide, may be a target object.

Embodiment 1

Figure 10:
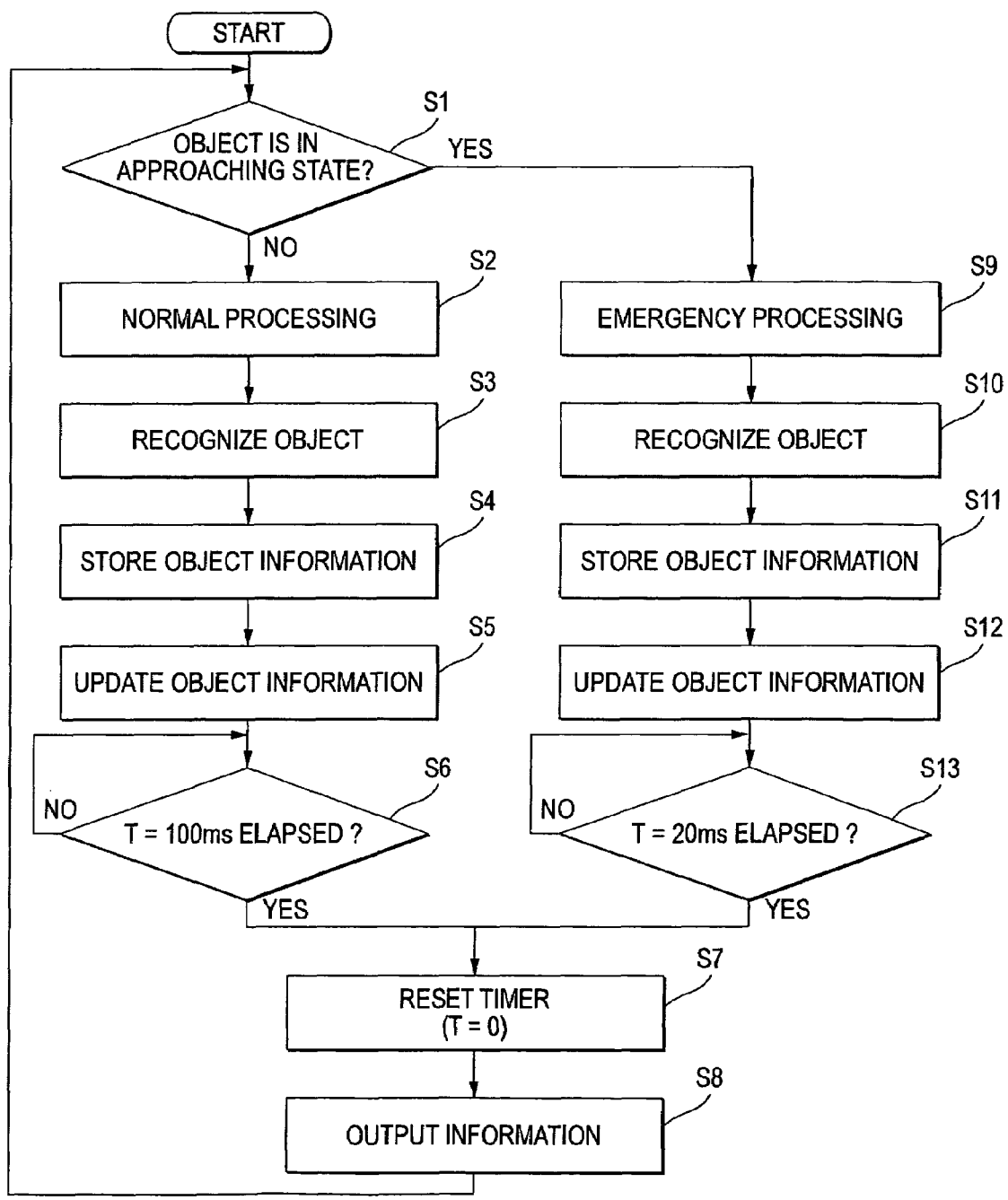
FIG. 10 is a flowchart showing a first embodiment of the invention.

FIG. 10 is a flowchart showing a first embodiment of this invention. The signal processing circuit 3 shown in FIG. 1 performs control shown in this flowchart. This applies to other flowcharts described later.

When radar scanning is started, it is determined whether or not an object is in the approaching state (S1) If it is determined that the object is not in the approaching state (NO), the normal processing is performed (S2). In the normal processing, the normal scanning is performed (S2) and the object is recognized (S3). A distance between the user's vehicle and the object, the relative speed therebetween, and the angle therebetween at the moment are detected and stored as object information (S4) so that the object information is updated (S5). It is assumed that in the normal scanning, scanning once takes about 100 ms. It is determined whether or not 100 ms has elapsed (S6). If elapsed (Yes), a timer is reset (T=0) (S7). The information such as the distance between the user's vehicle and the detected object, the relative speed therebetween, and the angle therebetween is output to the ECU 7 (S8). If 100 ms has not elapsed yet, the processing does not proceed to S7, but it is determined again in S6 whether or not 100 ms has elapsed.

On the other hand, when it is determined whether or not the object is in the approaching state (S1) and then it is determined that the object is in the approaching state (Yes), the processing is changed from the normal processing into the emergency processing (S9). The emergency processing includes stopping the antenna so as to be oriented in a predetermined direction, and executing the limited scanning with the antenna oriented in the predetermined direction. Under the emergency processing, the object is recognized (S10) The distance between the user's vehicle and the object, the relative speed therebetween, and the angle therebetween at the moment are detected and stored as the object information (S11) so that the object information is updated (S12). It is assumed that in the emergency processing, scanning once takes about 20 ms. It is determined whether or not 20 ms has elapsed (S13). If elapsed (Yes), the timer is reset (T=0) (S7). Then, the information such as the distance to the object, the relative speed thereof, and the angle thereof is output to the ECU 7 (S8). If 20 ms has not elapsed yet, the processing does not proceed to S7, but it is determined again in S13 whether or not 20 ms has elapsed.

FIGS. 11 to 14 are flowcharts showing how to determine whether or not a user's vehicle is in a dangerous area in the first embodiment of the invention. These flowcharts specifically show how determination is made in the step (S1 of FIG. 10) where it is determined whether or not an object is in the approaching state. The remaining parts of the flowchart are the same as those in FIG. 10.

Figure 11:
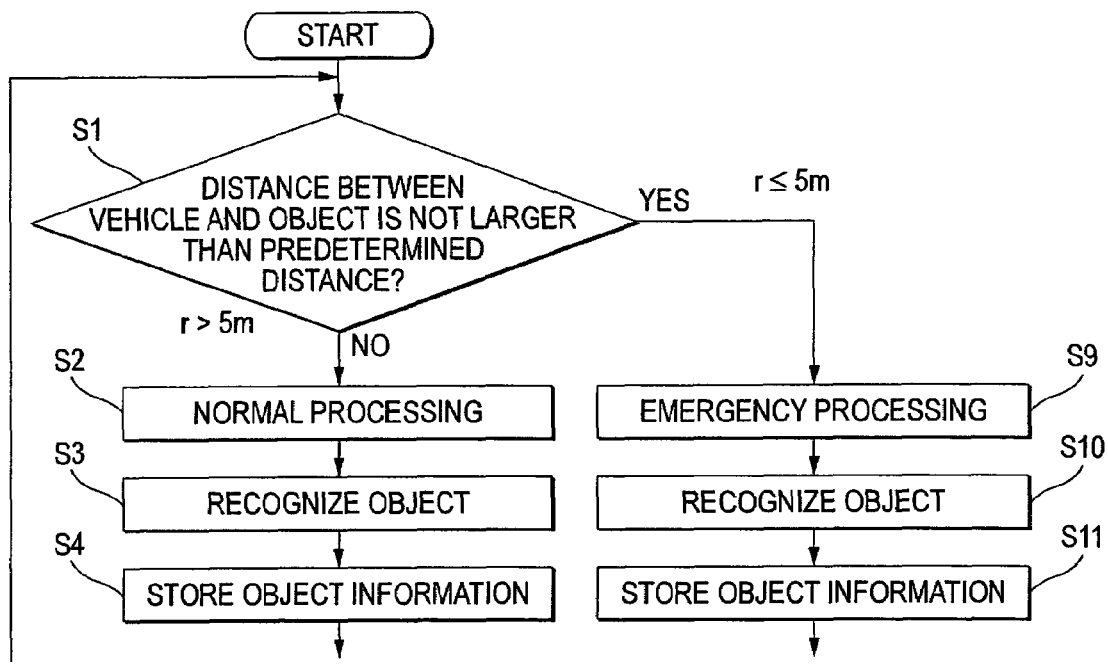
FIG. 11 is a flowchart showing how to determine whether or not an object is in the approaching state.

In FIG. 11, when the radar scanning is started, it is determined whether or not an object is in the approaching state (S1). In this case, it is determined whether or not a distance between the user's vehicle and the detected object is not larger than a predetermined distance. For example, in S1, if it is determined that the distance r between the user's vehicle and the object is r≦5 m, risk of collision is high. Therefore, it is determined that the object is in the approaching state (Yes). Thus, the emergency processing is performed (S9). On the other hand, if r>5 m, it is determined that the risk of collision is not so high. Thus, the normal processing is performed (S2).

Figure 12:
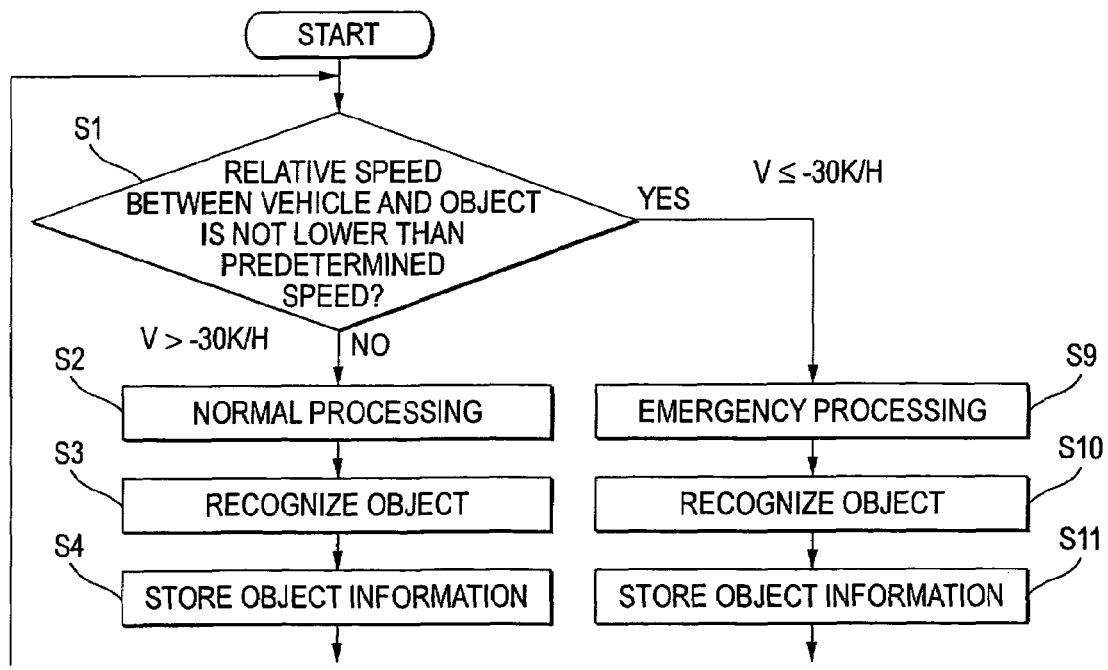
FIG. 12 is a flowchart showing how to determine whether or not an object is in the approaching state.

FIG. 12 shows another example. In FIG. 12, when the radar scanning is started, it is determined whether or not an object is in the approaching state (S1). In this case, it is determined whether or not the relative speed between the user's vehicle and the detected object is not smaller than a predetermined speed. For example, in S1, if it is determined that the relative speed v between the user's vehicle and the object is v≦−30 km/h, i.e. the object approaches to the user's vehicle at a speed not lower than 30 km/h, the risk of collision is high. Therefore, it is determined that the object is in the approaching state (Yes). Thus, the emergency processing is performed (S9). On the other hand, if v>−30 km/h, it is determined that the risk of collision is not so high. Thus, the normal processing is performed (S2).

Figure 13:
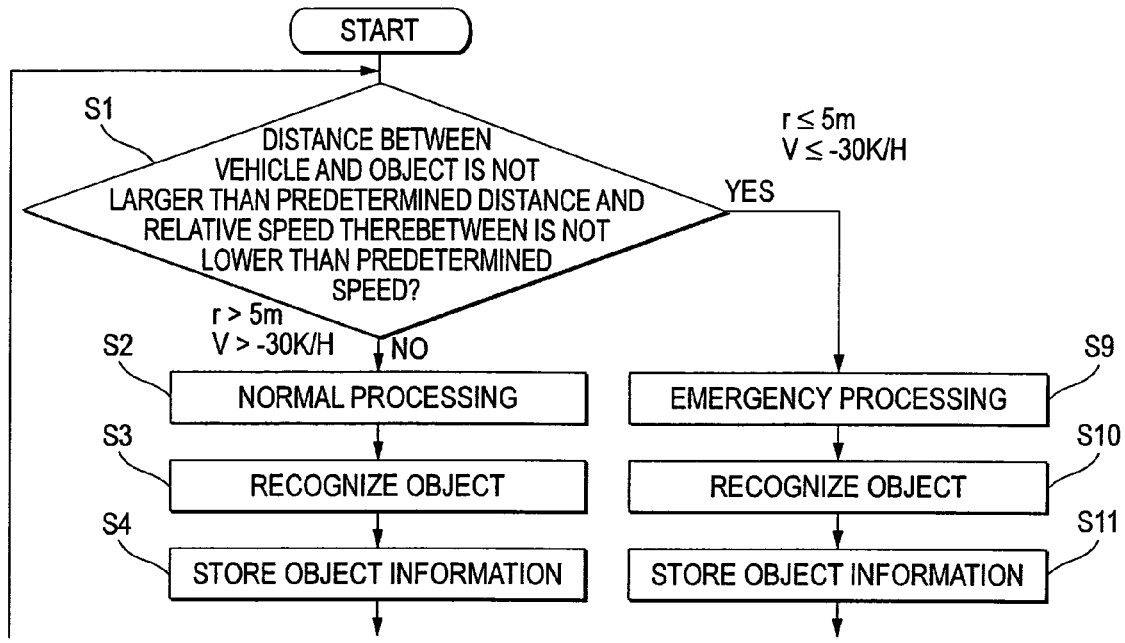
FIG. 13 is a flowchart showing how to determine whether or not an object is in the approaching state.

FIG. 13 shows still another example. In FIG. 13, when the radar scanning is started, it is determined whether or not an object is in the approaching state (S1) In this case, it is determined whether or not a distance between the user's vehicle and the detected object is not larger than a predetermined distance and whether or not the relative speed between the user's vehicle and the detected object is not lower than a predetermined speed. For example, in S1, if it is determined that the distance r between the user's vehicle and the detected object is r≦5 m and the relative speed between the user's vehicle and the object is v≦−30 km/h, risk of collision is high. Therefore, it is determined that the object is in the approaching state (Yes). Thus, the emergency processing is performed (S9). On the other hand, if r>5 m and/or v>−30 km/h, it is determined that the risk of collision is not so high. Thus, the normal processing is performed (S2).

Figure 14:
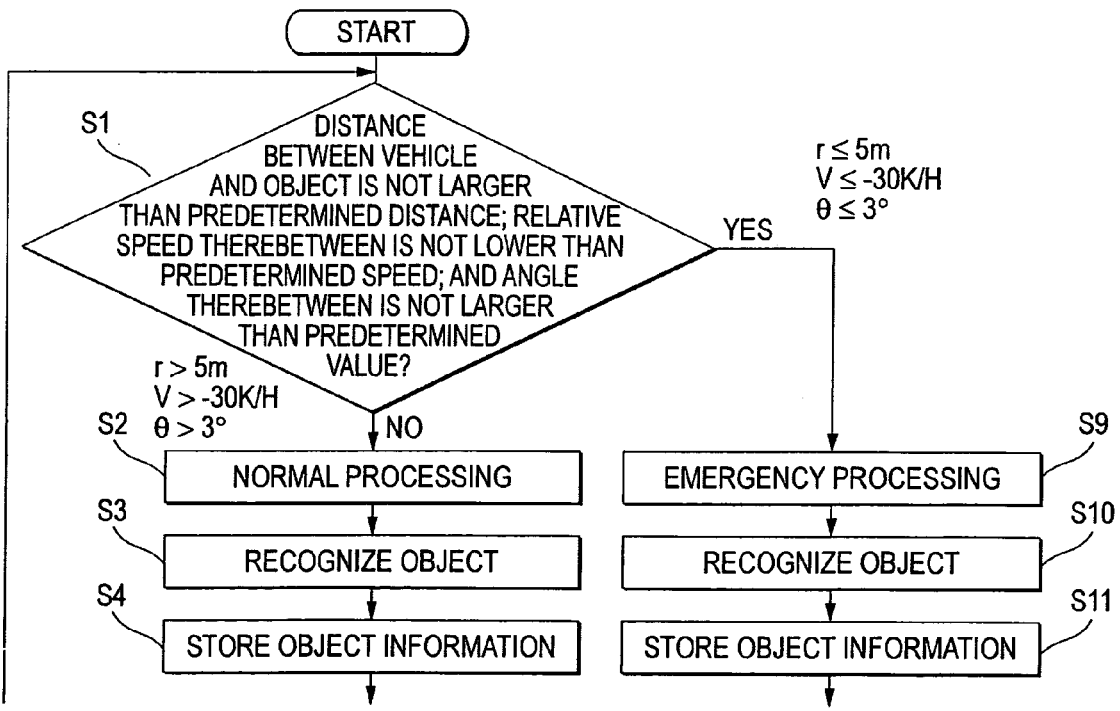
FIG. 14 is a flowchart showing how to determine whether or not an object is in the approaching state.

FIG. 14 shows a further example. In FIG. 14, when the radar scanning is started, it is determined whether or not an object is in the approaching state (S1). In this case, it is determined whether or not the distance between the user's vehicle and the detected object is not larger than a predetermined distance, whether or not the relative speed between the user's vehicle and the detected object is not lower than a predetermined speed, and whether or not the angle between the user's vehicle and the detected object is not larger than a predetermined value. If the angle is large, there is a higher possibility that the object is a vehicle running on an adjacent traffic lane. Therefore, the angle is adopted as criteria of the determination. Also, even if the object is the vehicle running on the same traffic lane; the distance is short; and the relative speed is high, the risk of collision is low so long as the angle is not smaller than a predetermined angle.

In FIG. 14, for example, in S1, if it is determined that the distance r between the user's vehicle and the detected object is r≦5 m; the relative speed v between the user's vehicle and the object is v≦−30 km/h; and the angle θ between the user's vehicle and the object is θ≦3°, risk of collision is high. Therefore, it is determined that the object is in the approaching state (Yes). Thus, the emergency processing is performed (S9). On the other hand, if any one among r>5 m, v>−30 km/h, and θ>3° is satisfied, it is determined that the risk of collision is not so high. Thus, the normal processing is performed (S2).

Embodiment 2

Figure 15:
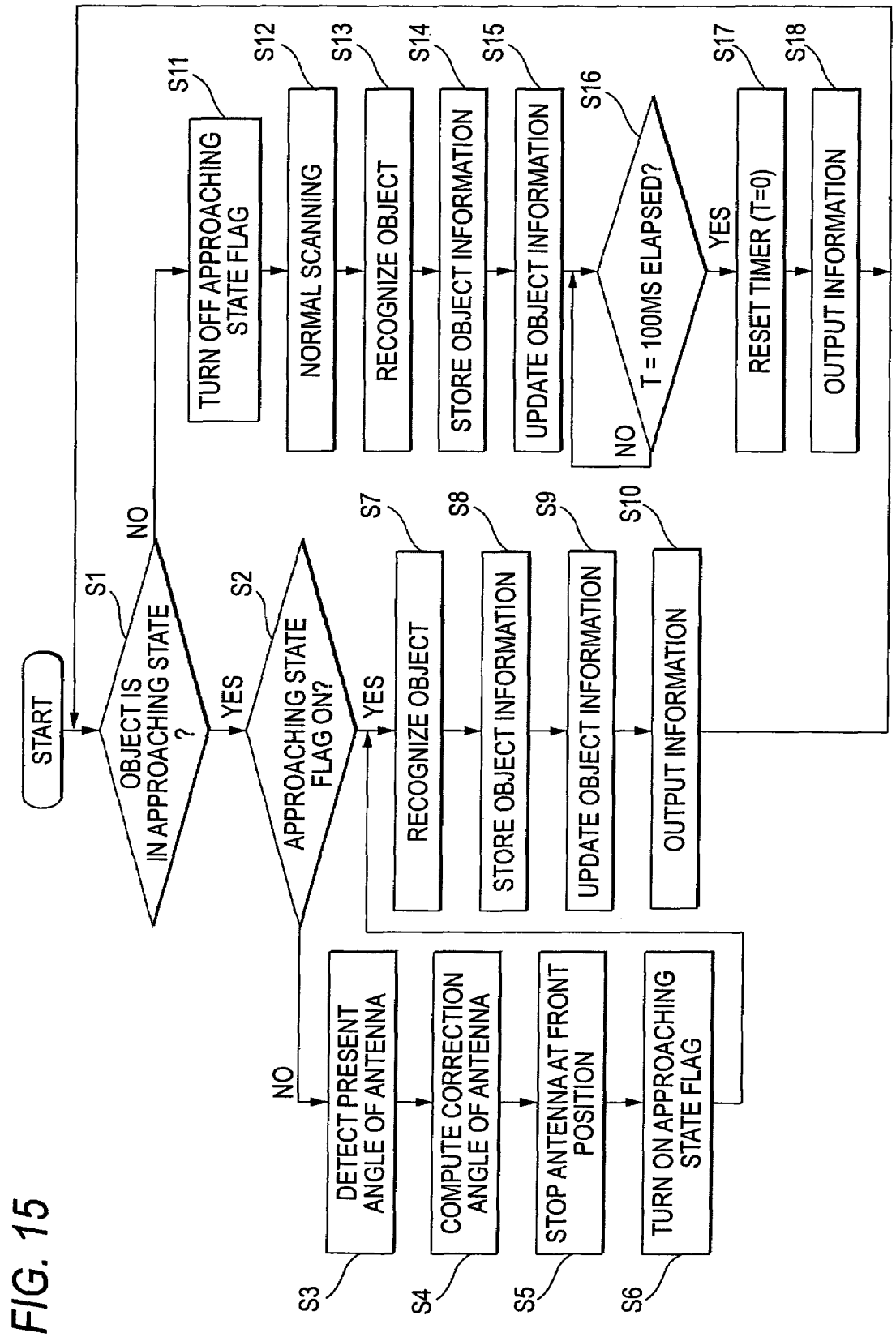
FIG. 15 is a flowchart showing a second embodiment of the invention.

FIG. 15 is a flowchart showing a second embodiment of the invention. In the second embodiment, if it is determined that the object is in the approaching state, the antenna is immediately stopped at a position where the antenna is oriented to the front of the user's vehicle as the emergency processing and then the detected object is recognized.

In FIG. 15, when the radar scanning is started, it is determined whether or not an object is in the approaching state (S1). If it is determined that the object is in the approaching state (Yes), whether or not an approaching state flag is ON is determined (S2). If it is first determined that the object is in the approaching state (No) in S2, the following emergency processing will be performed.

First, the present angle of the antenna that performs the normal scanning is detected (S3). This angle can be obtained by detecting how many degrees the antenna has moved leftward or rightward from the front direction of the user's vehicle indicated by line a. For example, if the antenna is at a position moved rightward by θ°, the angle is +θ°. If the antenna is at a position moved leftward by θ°, the angle is −θ°.

Next, an antenna-position correction angle is computed (S4). In this case, since the antenna is stopped at the position oriented to the front, the correction angle is +θ° or −θ° described above. The antenna is stopped at the front position on the basis of the correction angle computed (S5), and then the approaching state flag (S6) is turned ON.

Next, the object is recognized with while the antenna is stopped and oriented to the front (S7). The distance between the user's vehicle and the object, the relative speed between the user's vehicle and the object, and the angle between the user's vehicle and the object at the moment are detected and stored as the object information (S8) so that the object information is updated (S9). The information updated is output (S10).

On the other hand, if the approaching state flag is ON (Yes) in S2, the emergency processing has been performed in the previous flow and the antenna has been stopped with orienting to the front. Therefore, in this state, the object recognition is performed (S7). The object information is stored (S8). The object information is updated (S9). Finally, the information updated is output (S10).

Incidentally, if it is determined in S1 that the object is not in the approaching state (No), the approaching state flag is turned OFF (S11). The normal scanning is executed (S12). The processing from the object recognition (S13) to the information outputting (S18) is the same as that from S3 to S8 in FIG. 10.

In the second embodiment shown in FIG. 15, whether or not the object is in the approaching state can be determined on the basis of the distance between the user's vehicle and the object, the relative speed between the user's vehicle and the object, and the angle between the user's vehicle and the object as explained with reference to FIGS. 11 to 14.

Embodiment 3

Figure 17:
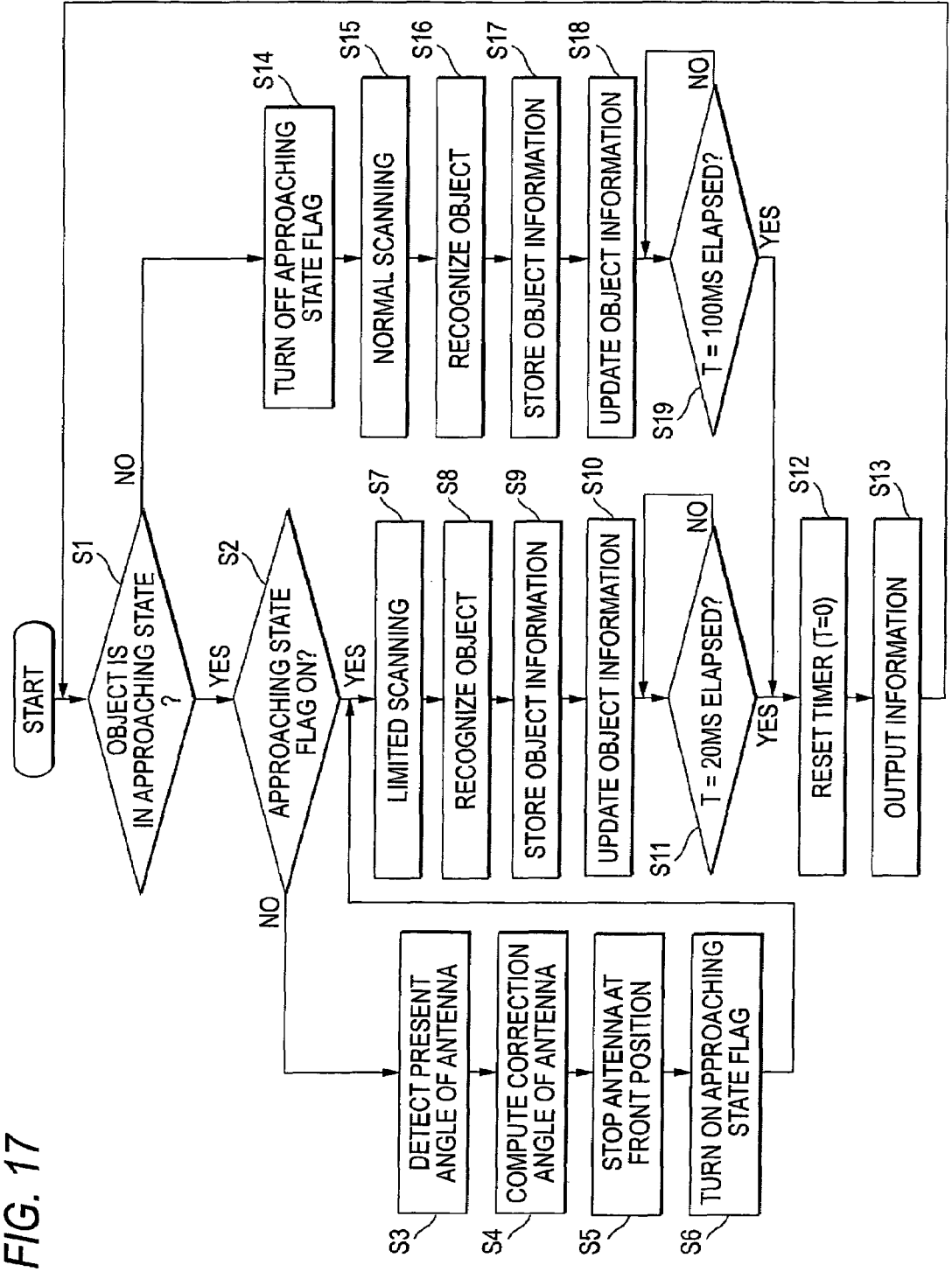
FIG. 17 is a flowchart showing a third embodiment of the invention.

FIG. 17 is a flowchart showing a third embodiment according to the invention. In the third embodiment, in a case where it is determined that an object is in the approaching state, the antenna is moved to a predetermined position for executing the limited scanning as the emergency processing and the detected object is recognized.

In FIG. 17, when the radar scanning is started, it is determined whether or not the object is in the approaching state (S1). If it is determined that the object is in the approaching state (Yes), whether or not the approaching state flag is ON is determined (S2). If it is first determined that the object is in the approaching state (No) in S2, the following emergency processing will be performed.

Figure 16:
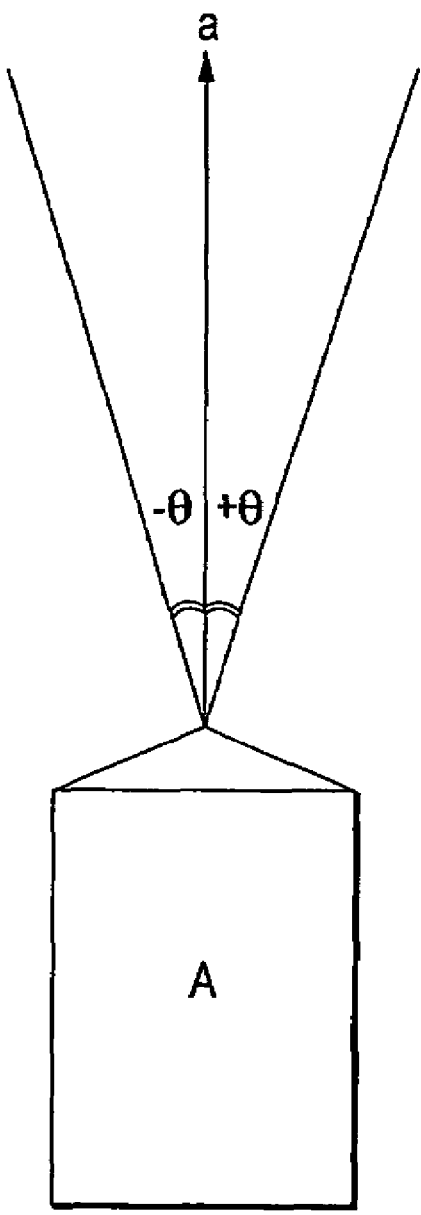
FIG. 16 is a view for explaining a scanning angle.

First, the present angle of the antenna that performs the normal scanning is detected (S3). This angle is the angle explained above with reference to FIG. 16. Next, the antenna-position correction angle is computed (S4). This correction angle is an angle employed to move the antenna from the present position to the front position. Then, the position of the antenna is corrected to the front position on the basis of the correction angle computed (S5). The approaching state flag is turned ON (S6).

Next, the limited scanning is executed in a state where the position of the antenna is corrected, i.e. is executed around the angle at which the antenna is oriented to the front. The object is recognized (S8). The distance between the user's vehicle and the object, the relative speed between the user's vehicle and the object, and the angle between the users vehicle and the object at the moment are detected and stored as the object information (S9) so that the object information is updated (S10). The processing from step S11 to step S13 is the same as that of step S13 to step S8 in the flowchart of FIG. 10.

On the other hand, if the approaching state flag is ON (Yes) in S2, the limited scanning has been executed in the previous flow and the antenna has been at the position for the limited scanning. Therefore, in this state, the limited scanning is executed (S7), and the processing of the object recognition and the others are executed subsequently.

Incidentally, if it is determined in S1 that the object is not in the approaching state (No), the approaching state flag is turned OFF (S14). The normal scanning is executed (S15). The processing from the object recognition (S16) to the information outputting (S13) is the same as that from S3 to S8 in FIG. 10.

In the third embodiment shown in FIG. 17, whether or not the object is in the approaching state can be determined on the basis of the distance between the user's vehicle and the object, the relative speed therebetween and the angle therebetween as explained with reference to FIGS. 11 to 14.

Embodiment 4

Figure 18:
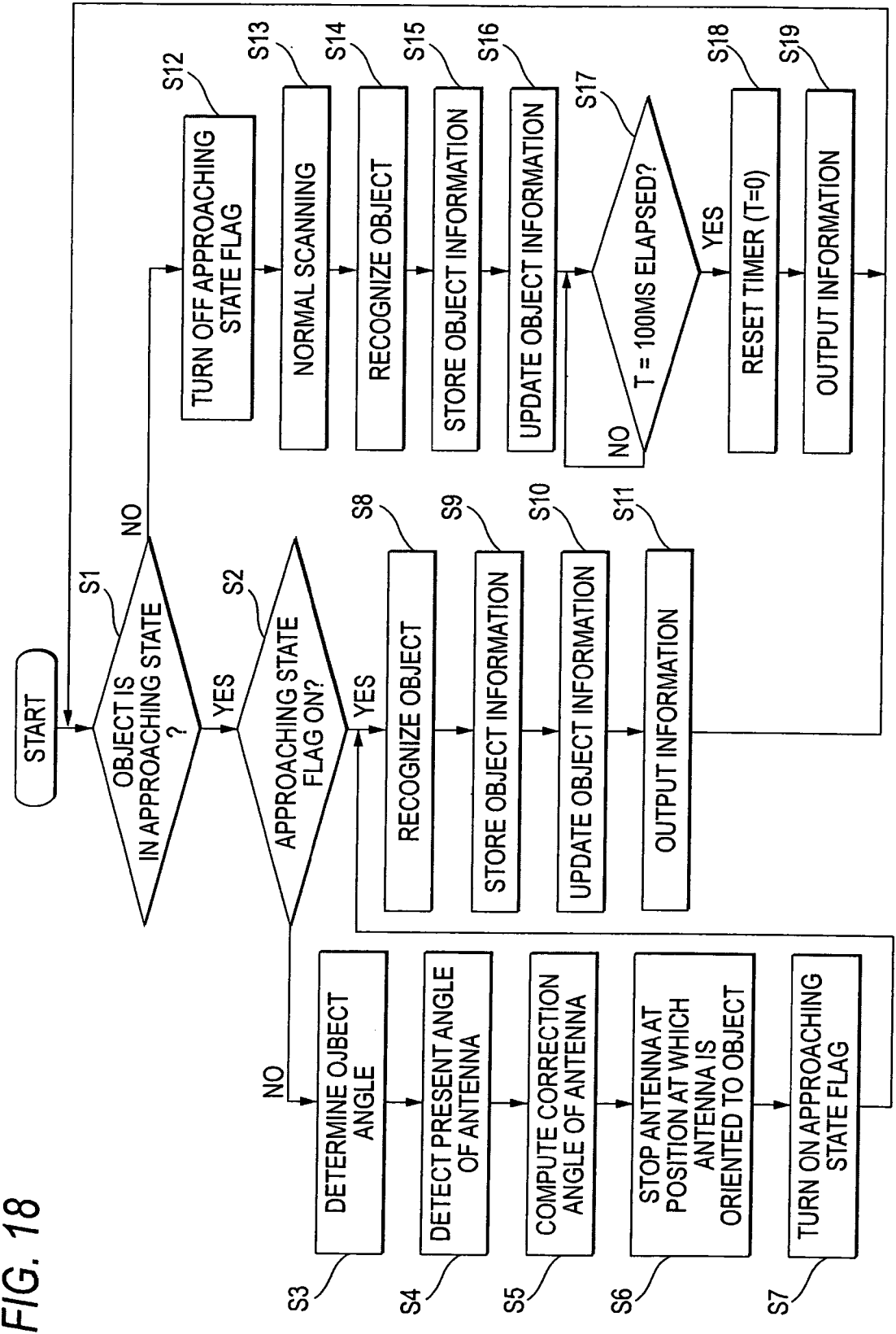
FIG. 18 is a flowchart showing a fourth embodiment of the invention.

FIG. 18 is a flowchart showing a fourth embodiment according to the invention. In the fourth embodiment, when it is determined that an object is in the approaching state, the antenna is immediately stopped at the angle at which the antenna is oriented to the detected object as the emergency processing, and then the object is recognized.

In FIG. 18, when the radar scanning is started, it is determined whether or not the object is in the approaching state (S1). If it is determined that the object is in the approaching state (Yes), whether or not the approaching state flag is ON is determined (S2). If it is first determined that the object is in the approaching state (No) in S2, the following emergency processing will be performed.

First, the angle between the user's vehicle and the object detected is determined (S3). Next, the present angle of the antenna that performs the normal scanning is detected (S4). This angle is the angle explained above with reference to FIG. 16.

Next, the antenna-position correction angle is computed (S5). In this case, since the antenna is stopped at the angle at which the antenna is oriented to the object, the correction angle is a difference between the present angle of the antenna and the angle at which the antenna is oriented to the object. On the basis of the correction angle computed, the antenna is stopped at the angle at which the antenna is oriented to the object (S6). Then, the approaching state flag is turned ON (S7).

The object is recognized in a state where the antenna is stopped at the angle where the antenna is oriented to the object (S8). The distance between the antenna and the object, the relative speed therebetween, and the angle therebetween at the moment are detected and stored as the object information (S9) so that the object information is updated (S10). The information updated is output (S11).

On the other hand, if the approaching state flag is ON (Yes) in S2, the emergency processing has been executed in the previous flow and the antenna has been stopped at the angle at which the antenna is oriented to the object. Therefore, in this state, the object recognition is executed (S8), the object information is stored (S9), the object information is updated (S10) and the information updated is output (S11).

Incidentally, if it is determined in S1 that the object is not in the approaching state (No), the approaching state flag is turned OFF (S12). In this state, the normal scanning is executed (S13). The processing from the object recognition (S14) to the information outputting (S19) is the same as that from S3 to S8 in FIG. 10.

In the fourth embodiment shown in FIG. 18, whether or not the object is in the approaching state can be determined on the basis of the distance between the user's vehicle and the object, the relative speed therebetween, and the angle therebetween as explained with reference to FIGS. 11 to 14.

Embodiment 5

Figure 19:
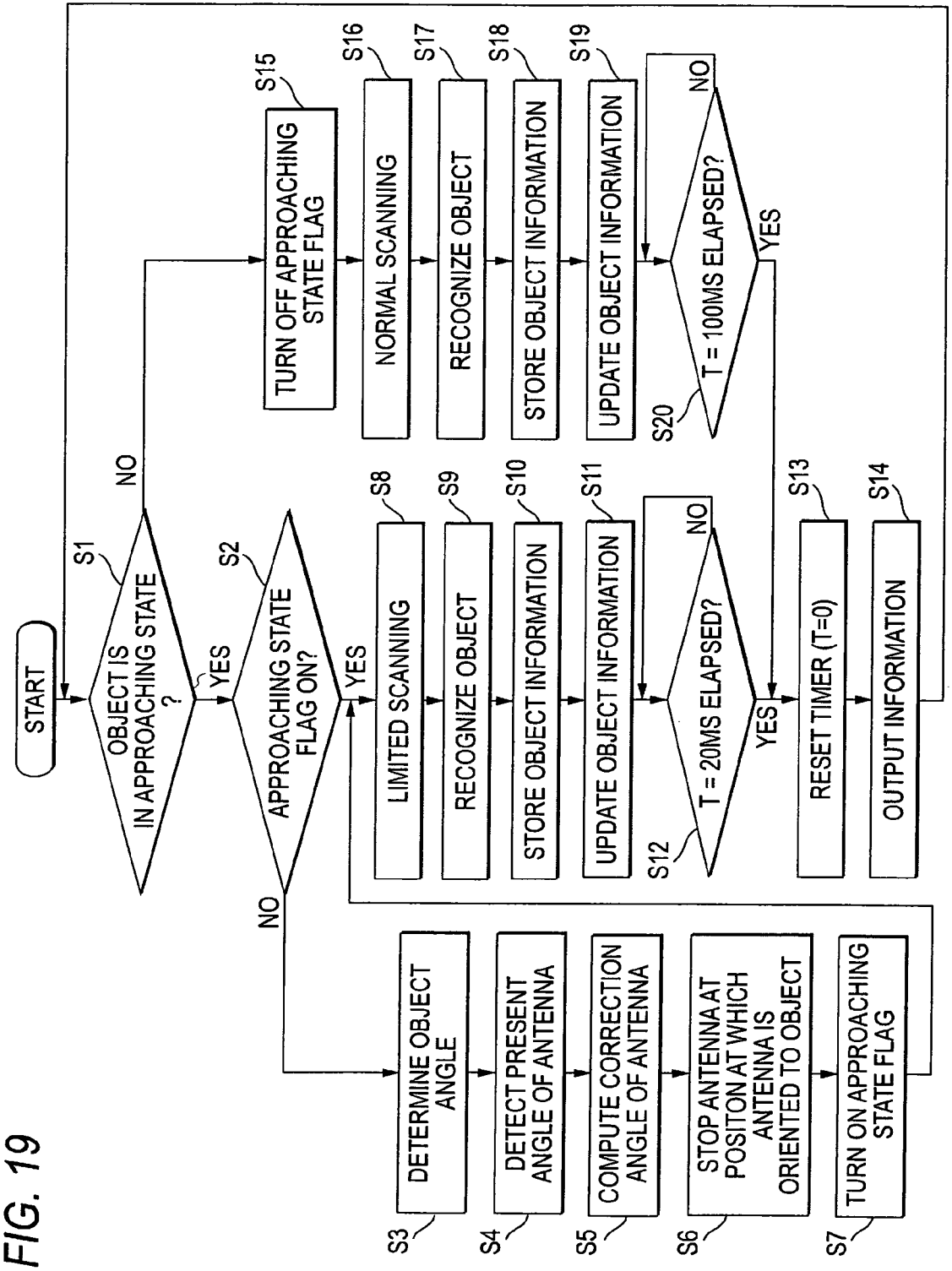
FIG. 19 is a flowchart showing a fifth embodiment of the invention.

FIG. 19 is a flowchart showing a fifth embodiment according to the invention. In the fifth embodiment, when it is determined that an object is in the approaching state, the limited scanning is immediately executed around the angle at which the antenna is oriented to the object as the emergency processing and then, the detected object is recognized.

In FIG. 19, when the radar scanning is started, it is determined whether or not the object is in the approaching state (S1). If it is determined that the object is in the approaching state (Yes), whether or not the approaching state flag is ON is determined (S2). If it is first determined that the object is in the approaching state (No) in S2, the following emergency processing will be performed.

First, the angle between the user's vehicle and the object detected is determined (S3). Next, the present angle of the antenna that performs the normal scanning is detected (S4). This angle is the angle explained above with reference to FIG. 16.

Next, the antenna-position correction angle is computed (S5) In this case, since the limited scanning is executed around the angle at which the antenna is oriented to the object, the correction angle is a difference between the present angle of the antenna and the angle at which the antenna is oriented to the object. On the basis of the correction angle computed, the antenna is moved and corrected to the angle at which the antenna is oriented to the object (S6), and then the approaching state flag is turned ON (S7).

Next, the limited scanning is executed around the angle at which the antenna is oriented to the object (S8) and the object recognition is executed (S9). The distance between the user's vehicle and the object, the relative speed therebetween, and the angle therebetween at the moment are detected and stored as the object information (S10) so that the object information is updated (S11). The processing from step S12 to step S14 is the same as that in step S13 to step S8 in FIG. 10.

On the other hand, if the approaching state flag is ON (Yes) in S2, the emergency processing has been executed in the previous flow and the antenna has performed the limited scanning around the angle at which the antenna is oriented to the object (S8). Therefore, in this state, the object recognition is executed (S9).

Incidentally, if it is determined in Si that the object is not in the approaching state (No), the approaching state flag is turned OFF (S15). In this state, the normal scanning is executed (S16). The processing from the object recognition (S17) to the information outputting (S14) is the same as that from S3 to S8 in FIG. 10.

In the fifth embodiment shown in FIG. 19, whether or not the object is in the approaching state can be determined on the basis of the distance between the user's vehicle and the object, the relative speed therebetween, and the angle therebetween as explained with reference to FIGS. 11 to 14.

Embodiment 6

Figure 20:
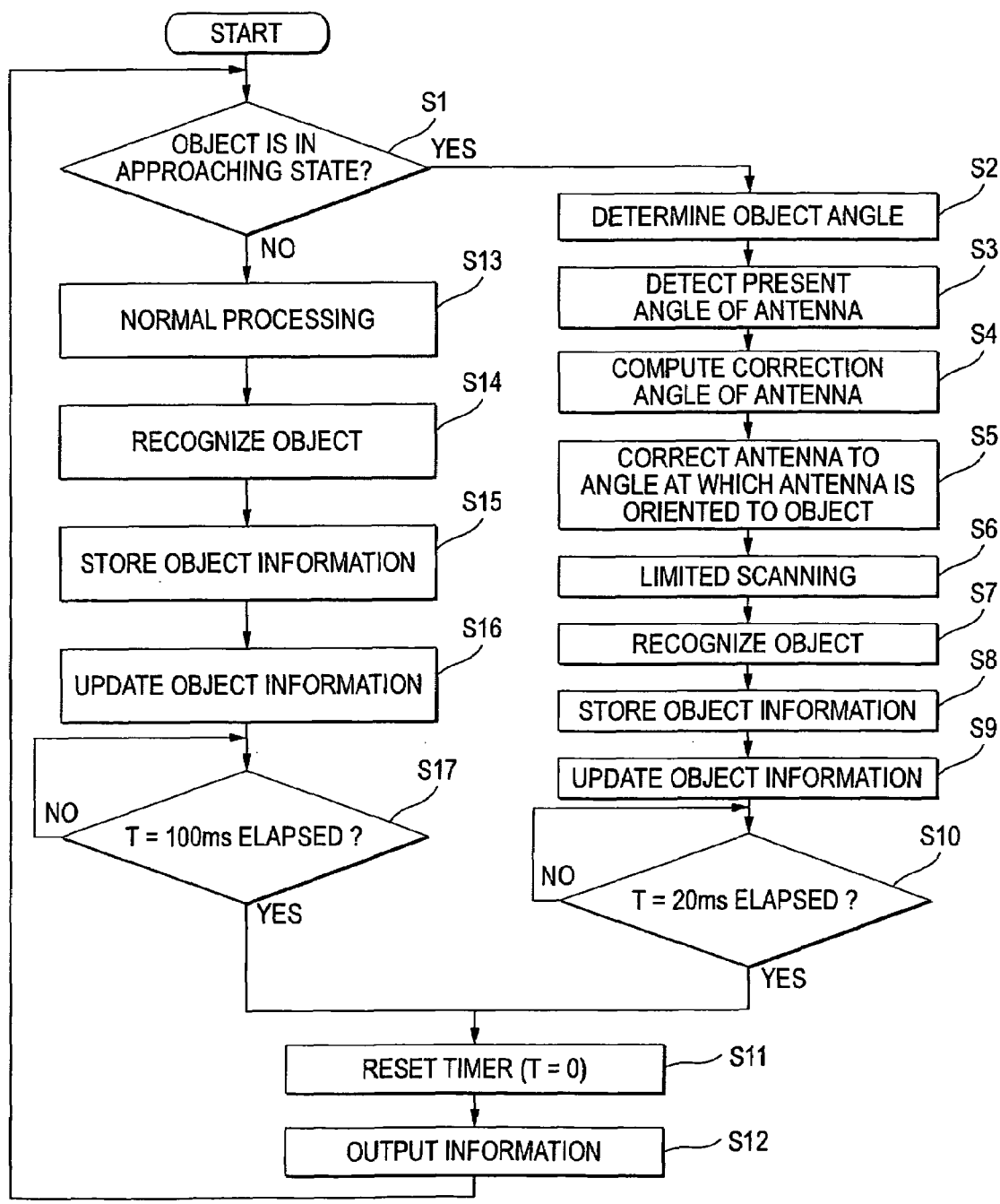
FIG. 20 is a flowchart showing a sixth embodiment of the invention.

FIG. 20 is a flowchart showing a sixth embodiment according to the invention. In the sixth embodiment, when it is determined that the object is in the approaching state, the limited scanning is immediately executed around the angle at which the antenna is oriented to the object as the emergency processing. In addition, whenever a position of the object changes so that an angle between the user's vehicle and the object is changed, the angle of the antenna is changed to another angle at which the antenna is oriented to the object; the limited scanning is executed around this another angle; and then the object is recognized.

In FIG. 20, when the radar scanning is started, it is determined whether or not the object is in the approaching state (S1). If it is determined that the object is in the approaching state (Yes), the angle between the user's vehicle and the detected object is determined (S2). Next, the present angle of the antenna is detected (S3). This angle is the angle explained above with reference to FIG. 16.

Next, the antenna-position correction angle is computed (S4). In this case, since the limited scanning is executed around antenna at which the angle is oriented to the object, the correction angle is a difference between the present angle of the antenna and the angle at which the antenna is oriented to the object. On the basis of the correction angle computed, the antenna is moved and corrected to the angle at which the antenna is oriented to the object (S5).

Next, the limited scanning is executed around the angle at which the antenna is oriented to the object (S6) and then, the object recognition is executed (S7). The distance between the user's vehicle and the object, the relative speed therebetween and the angle therebetween at the moment are detected and stored as the object information (S8) so that the object information is updated (S9). The processing from step S10 to step S12 is the same as that in step S13 to step S8 in FIG. 10.

In the subsequent flow, if it is determined that the object is still in the approaching state, the processing proceeds to step S2 again. At this moment, if a position of the object changes so that the angle between the user's angle and the object is changed, the antenna is corrected to the object angular position after changed (S5) and the limited scanning is executed around the resultant angle as shown in FIG. 9 (S6).

On the other hand, if it is determined in S1 that the object is not in the approaching state (No), the normal scanning is executed (S13). The processing from step S14 to step S19 is the same as the processing from S3 to S8 in FIG. 10.

In the sixth embodiment shown in FIG. 20, whether or not the object is in the approaching state can be determined on the basis of the distance between the user's vehicle and the object, the relative speed therebetween and the angle therebetween as explained with reference to FIGS. 11 to 14.

Embodiment 7

Figure 21:
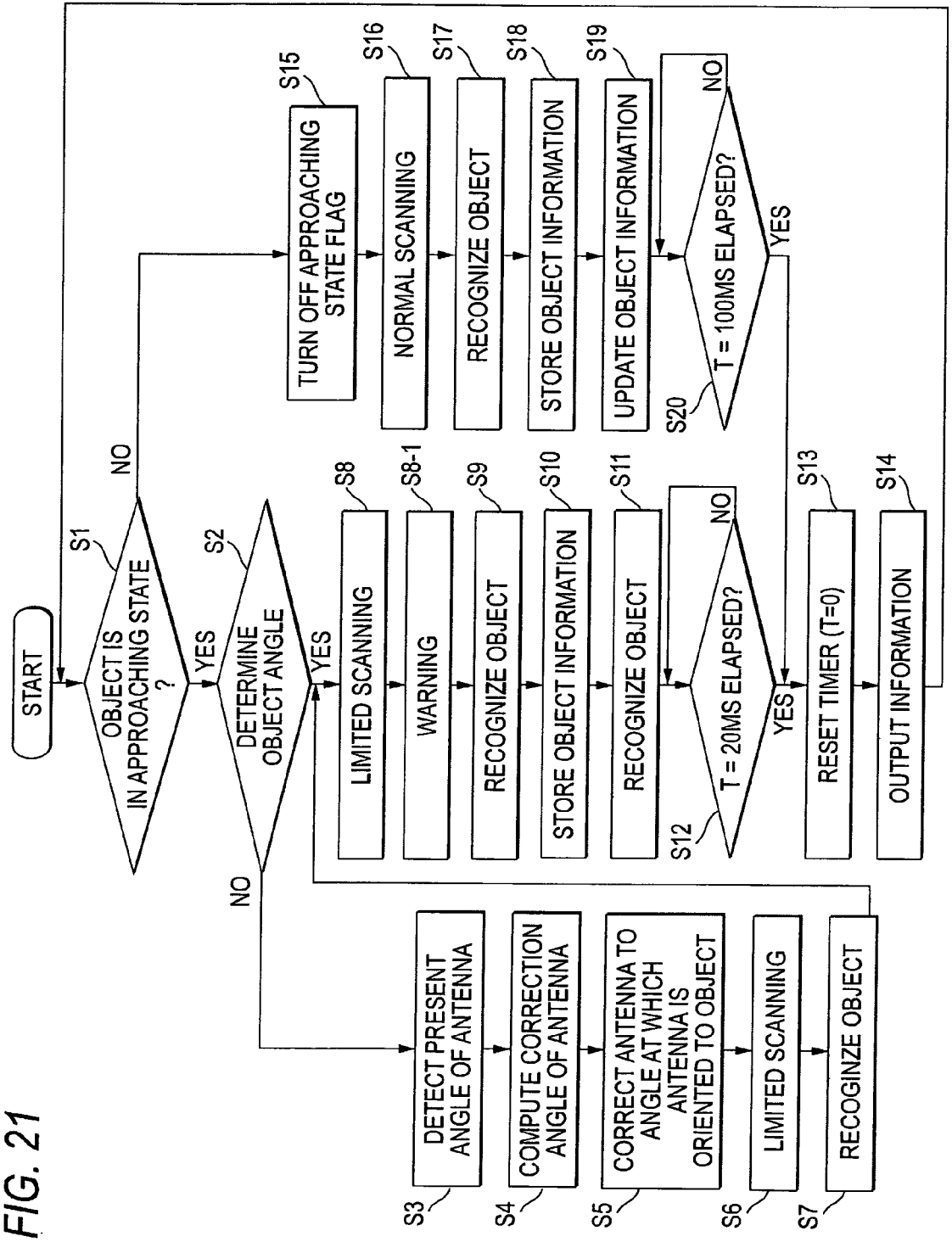
FIG. 21 is a flowchart showing a seventh embodiment of the invention.

FIG. 21 is a flowchart showing a seventh embodiment according to the invention. In the seventh embodiment, when it is determined that the object is in the approaching state, the emergency processing is performed and a warning is issued.

The flowchart of FIG. 21 is substantially the same as that of FIG. 19. The flowchart of FIG. 21 is different from that of FIG. 19 in that when the emergency processing is performed on the basis of the determination that the object is in the approaching state, the warning is issued in step S8-1 by light flashing or voice.

As described above, in the embodiment shown in FIG. 21, the warning is issued when the emergency processing is performed. Also, in the other embodiments, the warning may be likewise issued.

Although the above embodiments have been explained in connection with the operation of the radar sensor section in the mechanical scanning system, it is needless to say that the same operation can be performed in the apparatus having the radar sensor section in the electronic scanning system as described above.

What is claimed is:

1. A scanning method of an in-vehicle scanning-type radar for emitting beams subsequently to execute scanning and for detecting an object, the method comprising:

determining whether or not the object is in an approaching state;

when it is determined that the object is not in the approaching state, executing a first scanning for scanning within a first angle range; and when it is determined that the object is in the approaching state, executing a second scanning for scanning within a second angle range that is narrower than the first angle, range, wherein:

a period during which the radar scans the second angle range once in the second scanning is shorter than that during which the radar scans the first angle range once in the first scanning, the first scanning is executed by emitting a first plurality of beams from the radar at an interval of a predetermined angle, and the second scanning is executed by emitting a second plurality of beams which is fewer than the first plurality of beams from the radar at an interval of the predetermined angle.

2. The method according to claim 1, wherein the radar executes the second scanning with a front of a vehicle being in a center of the scanning.

3. The method according to claim 1, wherein the radar executes the second scanning with the detected object being in a center of the scanning.

4. The method according to claim 1, wherein the radar executes the second scanning with the detected object being in a center of the scanning while the radar changes the center of the scanning in accordance with change of a position of the object.

5. The method according to claim 1, wherein when a distance between a vehicle and the object is not larger than a determined distance, it is determined that the object is in the approaching state.

6. The method according to claim 1, wherein when the object approaches to a vehicle at a relative speed not lower than a predetermined speed, it is determined that the object is in the approaching state.

7. The method according to claim 1, wherein when a distance between a vehicle and the object is not larger than a predetermined distance and the object approaches to the vehicle at a relative speed not lower than a predetermined speed, it is determined that the object is in the approaching state.

8. The method according to claim 1, wherein when (a) a distance between a vehicle and the object is not larger than a predetermined distance; (b) the object approaches to the vehicle at a relative speed not lower than a predetermined speed; and (c) an angle between the radar and the object is not larger than a predetermined angle, it is determined that the object is in the approaching state.

9. The method according to claim 1, further comprising:
when it is determined that the object is in the approaching state, issuing warning.

10. The method according to claim 1, further comprising:
storing object information including at least one of a distance between a vehicle and the object, a relative speed therebetween, and an angle therebetween.

11. The method according to claim 1, wherein
each of the second plurality of beams emitted for scanning within the second angle range is equivalent to one of a subset of the first plurality of beams emitted for scanning within the first angle range.

12. A scanning method of an in-vehicle scanning-type radar compnsing:
determining whether or not an object is in an approaching state;
when it is determined that the object is not in the approaching state, scanning within a range of a first angle by emitting a plurality of beams from the radar at an interval of a second angle; and
when it is determined that the object is in the approaching state, emitting only a single beam from the radar in a fixed, predetermined direction without scanning.

13. The method according to claim 12, wherein the predetermined direction corresponds to a front of a vehicle.

14. The method according to claim 13, wherein the predetermined direction corresponds to a direction in which the object is detected.

15. A radar for emitting beams subsequently to execute scanning and detecting an object, the radar comprising:
an antenna that emits the beams and receives reflected beams;
a signal processing circuit that inputs transmission signals to the antenna to cause the antenna to emit the beams, receives reflected signals from the antenna in response to the reflected beams, determines whether or not the object is in an approaching state, and inputs control signals to a scanning mechanism; and
the scanning mechanism that controls a direction of the antenna and an angle range of the scanning in accordance with the control signals input from the signal processing circuit, wherein:
when the signal processing circuit determines that the object is not in the approaching state, the scanning mechanism controls the direction of the antenna to execute a first scanning for scanning within a first angle range;
when the signal processing circuit determines that the object is in the approaching state, the scanning mechanism controls the direction of the antenna to execute a second scanning for scanning within a second angle range that is narrower than the first angle range; and
a period during which the radar scans the second angle range once in the second scanning is shorter than that during which the radar scans the first angle range once in the first scanning.

16. The radar according to claim 15, wherein:
the first scanning is executed by emitting a first plurality of beams from the radar at an interval of a predetermined angle; and
the second scanning is executed by emitting a second plurality of beams which is fewer than the first plurality of beams from the radar at an interval of the predetermined angle.

17. The radar according to claim 16, wherein in the second scanning, the scanning mechanism changes the direction of the antenna with a front of a vehicle being in a center of the scanning.

18. The radar according to claim 16, wherein in the second scanning, the scanning mechanism changes the direction of the antenna with the detected object being in a center of the scanning.

19. The radar according to claim 16, wherein in the second scanning, the scanning mechanism changes the direction of the antenna with the detected object being in a center of the scanning while changing the center of the scanning in accordance with change of a position of the object.

20. The radar according to claim 16, wherein the second angle range consists of a predetermined angle.

21. The radar according to claim 16, wherein:
the signal processing circuit calculates a distance between a vehicle and the object on the basis of the transmission signals and the reflected signal; and
when the calculated distance therebetween is not larger than a determined distance, the signal processing circuit determines that the object is in the approaching state.

22. The radar according to claim 16, wherein:
the signal processing circuit calculates a relative speed between a vehicle and the object on the basis of the transmission signals and the reflected signal; and
when the object approaches to a vehicle at the relative speed not lower than a predetermined speed, the signal processing circuit determines that the object is in the approaching state.

23. The radar according to claim 16, wherein:
the signal processing circuit calculates:
a distance between a vehicle and the object; and
a relative speed therebetween;
on the basis of the transmission signals and the reflected signal; and
when the calculated distance therebetween is not larger than a predetermined distance and the object approaches to the vehicle at the relative speed not lower than a predetermined speed, the signal processing circuit determines that the object is in the approaching state.

24. The radar according to claim 16, wherein:
the signal processing circuit calculates:
a distance between a vehicle and the object;
a relative speed therebetween; and
an angle therebetween;
on the basis of the transmission signals and the reflected signal; and
when (a) the distance therebetween is not larger than a predetermined distance; (b) the object approaches to the vehicle at the relative speed not lower than a predetermined speed; and (c) the angle therebetween is not larger than a predetermined angle, the signal processing circuit determines that the object is in the approaching state.

25. The radar according to claim 16, further comprising:
an alarm device that issues warning when the signal processing circuit determines that that the object is in the approaching state.

26. The radar according to claim 16, wherein the signal processing circuit outputs object information including at least one of a distance between a vehicle and the object, a relative speed therebetween, and an angle therebetween.

27. The radar according to claim 16, wherein
each of the second plurality of beams emitted for scanning within the second angle range is equivalent to one of a subset of the first plurality of beams emitted for scanning within the first angle range.

* * * * *